(12) United States Patent
Brough et al.

(10) Patent No.: US 11,904,549 B2
(45) Date of Patent: Feb. 20, 2024

(54) METHOD AND APPARATUS FOR 3D PRINTING USING A MATERIAL FEEDER

(71) Applicant: Impossible Objects, Inc., Northbrook, IL (US)

(72) Inventors: James Brough, Buffalo Grove, IL (US); Robert Swartz, Highland Park, IL (US); Nick Tarzian, Skokie, IL (US); Eugene Gore, Des Plaines, IL (US)

(73) Assignee: Impossible Objects, Inc., Northbrook, IL (US)

( * ) Notice: Subject to any disclaimer, the term of this patent is extended or adjusted under 35 U.S.C. 154(b) by 377 days.

(21) Appl. No.: 17/393,164

(22) Filed: Aug. 3, 2021

(65) Prior Publication Data

US 2023/0042876 A1 Feb. 9, 2023

(51) Int. Cl.
| | |
|---|---|
| *B29C 64/321* | (2017.01) |
| *B33Y 40/00* | (2020.01) |
| *B65H 3/00* | (2006.01) |
| *B29C 64/245* | (2017.01) |
| *B29C 64/153* | (2017.01) |

(52) U.S. Cl.
CPC .......... *B29C 64/321* (2017.08); *B29C 64/245* (2017.08); *B33Y 40/00* (2014.12); *B65H 3/00* (2013.01); *B29C 64/153* (2017.08)

(58) Field of Classification Search
CPC ...... B29C 64/245; B29C 64/321; B33Y 40/00
See application file for complete search history.

(56) References Cited

U.S. PATENT DOCUMENTS

| | | | | |
|---|---|---|---|---|
| 2015/0231825 A1* | 8/2015 | Swartz | ...................... | B32B 1/00 |
| | | | | 428/156 |
| 2016/0082658 A1* | 3/2016 | Swartz | ...................... | B32B 5/02 |
| | | | | 264/258 |
| 2017/0274595 A1* | 9/2017 | Swartz | .................. | B29C 64/165 |

* cited by examiner

*Primary Examiner* — James Sanders
(74) *Attorney, Agent, or Firm* — Dunlap Bennett & Ludwig, PLLC (57) ABSTRACT

A felt gripper head contains two regions of felt material each on plates that slide and form a slight angle with respect to each other during engagement with a fibrous substrate material.

7 Claims, 9 Drawing Sheets

METHOD AND APPARATUS FOR 3D PRINTING USING A MATERIAL FEEDER

FIELD OF THE INVENTION

The present inventions are in the field of 3D printing processes and systems. More specifically, the improvements are in the material feeder, platen and stacker subsystems of a larger system that creates 3D printed parts. These improvements lie within a subfield of 3D printing that the assignee hereunder originated, and that the assignee calls Composite-Based Additive Manufacturing (CBAM). These improvements provide advantages in the subsystems each considered by itself, as well as advantages in the interoperation of subsystems in a complete system and method for creating a 3D printed part.

BACKGROUND OF THE INVENTION

U.S. Pat. No. 10,046,552 (incorporated herein by reference in its entirety) describes a system for the creation of 3D printed parts. This system operates according to principles that the assignee hereunder calls Composite-Based Additive Manufacturing (CBAM). In CBAM, a computer model divides a part to be printed into cross-sectional slices. Using printing technology (e.g., inkjet), a liquid is printed onto a porous sheet in a shape that corresponds to one of the cross sections of the object. The porous sheets are typically carbon fiber, but may also comprise fiberglass or other suitable substrates. Also, the printing could occur on the end of a fed roll (or web), with cutting done at a downstream stage. The printed sheet gets flooded with a powder (typically, a thermoplastic powder) such that the powder adheres to printed regions and not to unprinted regions. Various means are deployed (e.g., vacuum, vibration, air knifing) to remove unadhered powder from a sheet. The sheet then moves to a stacking stage, where it is placed on top of a previous sheet (if present) that has gone through a similar process for the immediately adjacent object cross section. The stacker uses tapered registration pins to keep the sheets aligned, fitting into holes that got punched into such sheets at the upstream printing stage. The process is repeated for as many cross sections as will be needed to create a build block of multiple substrate sheets, each stacked on top of the other in the exact order needed to represent all cross sections of the 3D object. The build block is subjected to subsequent processing in the form of compression and heating, in order for powder on the printed areas to melt and fuse. The resulting build block after compression and heating is then subjected to abrasion to remove substrate material, e.g., the friable carbon fiber regions that were never printed and flooded with powder. The melted/fused regions resist this abrasion, and thus emerge from the process in the intended shape of the final 3D printed part defined by the computer model. Advantageously, the use of carbon fiber and thermoplastic powder in this way leads to a resulting part that is extremely durable and well suited for high tolerances needed in industrial applications—hence, it is a "composite-based" 3D printed part. The '552 patent describes various aspects of the foregoing system, and embodiments of subsystems that carry out each stage (i.e., material feeding, printing on a platen, powdering, removing powder, stacking, etc.).

The '552 patent describes alternative ways to carry out material feeding, from a repository of to-be-printed sheets toward the printing stage. This was not a straightforward activity, since a typical substrate sheet is made from carbon fiber. Unlike conventional paper, non-woven sheets such as carbon fiber sheets strongly resist sliding against one another. They also tend to cohere, such that picking up one sheet from a stack has a probability of picking up the one just below it. One way that the assignee hereunder deployed to address these problems was to use a felt gripper, essentially made of the same material as a dry eraser. It was observed that the felt gripper permitted adequate lift to remove a sheet off a stack. However, the problem of cohering sheets remained. If a double sheet inadvertently entered the process, that ruined the final part. The solution in the '552 patent was to place special notches on edges of the sheets, manually pre-stack adjacent sheets so that they always were perpendicularly arranged, and during lifting by the felt gripper use hold downs that passed through the top sheet's notch to hold down the next sheet and prevent it from rising. While this worked well to prevent the tagalong sheet problem, it had the disadvantage of requiring manual arrangement of fed sheets prior to beginning a print run.

U.S. application Ser. No. 17/156,538 (commonly assigned to the assignee hereunder and incorporated herein by reference in its entirety) describes an improved material feeder that potentially eliminates the need for manual perpendicular arranged sheets with notches. That application describes the use of edge flickers. In operation, when the felt gripper holding a top sheet pulls up, the edges of such sheet pass tabs or fingers that create a bending distortion just at the edge. This bend is often enough to loosen the top sheet from the sheet immediately below it. But the technique is not uniformly reliable, and sometimes the next sheet will tag along anyway. Furthermore, some substrates are more stiff and less attractive to the felt gripper, such as fiberglass. Using flickers with a felt gripper picking up fiberglass in the previous manner creates a risk of the sheet dropping off entirely. Thus, while flickers eliminate the need to make the manual perpendicular sheet arrangement, they turned out not to be a reliable solution to the problem by themselves.

U.S. Published App. No. 20180264725A1 (commonly assigned to the assignee hereunder and incorporated herein by reference in its entirety) describes in greater detail an embodiment of a particular platen subsystem. Unique to CBAM printing, the inkjet heads must spray liquid onto a thin porous surface (e.g., a carbon fiber substrate sheet). This is different from conventional paper printing, because paper is intended to absorb (not pass through) all printed liquid. Thus a fluid management problem arises, based on waste liquid that will inevitably arise in the CBAM process. The '725 publication addresses this problem through a platen that uses 18 thin wires to support the substrate sheet, over a reservoir to receive the waste liquid. The reservoir can receive an absorbent pad, which is easily replaced during the process as waste liquid builds up. In use, however, it was observed that despite how thin the wires were, liquid (i.e., ink) would potentially reside on the wire from sheet to sheet. At a subsequent sheet, this could place liquid on the back of that sheet at a region not intended to receive liquid. This led to errors in the future powder deposition stage, where a region not intended to have powder adhesion retained powder, thus ruining the final printed part.

Also, to enhance registration accuracy, the assignee hereunder devised the subsystem to punch registration holes for future stacking during the printing stage. The platen described in the '725 publication contains locations that serve as backs (in the embodiment, made from wood) when the punch comes down to land on the substrate sheet. The punch and backs sandwich the substrate sheet at the punch location, facilitating removal of material to make those holes. However, it was discovered that in the platen design of the '725 publication, the platen lacked sufficient rigidity for consistent and accurate punching each time. A bounce-back problem would also potentially distort the sheet location before printing. Also, given the platen's construction that included punch backs, assembly of the platen into a larger machine was relatively cumbersome.

U.S. Pat. No. 10,597,249 (commonly assigned to the assignee hereunder and incorporated herein by reference in its entirety) describes in greater detail an embodiment of a stacker subsystem. This subsystem operates upon a sheet's exit from the powder system. A fully prepared sheet (powder-flooded, and then vacuumed to remove unwanted powder) leaves the powder system on a single conveyor. Upon reaching the end of the conveyor, it moves based on accumulated momentum onto a sheet catcher deployed in the form of complementary leaf springs in the top cage of the stacker. Once the sheet is sensed present on the leaf springs, a press plate descends from above and pushes on the sheet, forcing the leaves apart, continuing to press the sheet downward. Registration pins below the leaf spring will then line up with the previously punched registration holes, allowing a guided descent of the sheet onto a preexisting stack of sheets. It was discovered that using this arrangement, sometimes sheets would not enter their proper alignment on the downward push. One of the problems with this solution was that the sheet had too many degrees of freedom and could easily be pushed off kilter by slight air movements or unbalanced printed powder on the sheet. This required manual intervention or would otherwise ruin the intended 3D printed part.

It is an object of the inventions described herein to overcome the problems and disadvantages of the prior subsystems (and prior subsystem interoperation), described above, or otherwise inherent in the earlier designs.

SUMMARY OF THE INVENTION

With respect to the material feeder, advantageous use is made of two properties previously unappreciated in felt gripping. In a first aspect, gripping strength is enhanced when the initial contact between felt and substrate is a sliding contact rather than purely downward. A sliding contact causes greater interlacing of fibers, thus increasing the grip force. In a second aspect, it was discovered that placing felt on two plates permits those plates to be positioned during operation to a slightly angled (e.g., 2-5 degree) orientation with respect to each other. This second property has the advantageous effect of causing a planar distortion that decouples a substrate sheet just underneath the sheet being gripped. This significantly mitigates the tagalong sheet problem. When combined with the above-described flickers, the tagalong sheet problem is essentially eliminated. In accordance with these principles, the embodiment described herein uses a single felt gripper head that has independently moving regions of felt in a structure that distorts the substrate slightly as the gripper comes down from above.

With respect to the platen, it has been converted to a structure in which the platen no longer contains the punch backs. Those punch backs instead rest directly on aluminum blocks secured to the table top, so that the platen itself now does not directly receive any force from the punch heads. Punch backs stay rigid during the punch operation. In addition, the new platen structure is now lighter and simpler, does not distort from punch vibrations, and is removably encased on the table top between rails for easier processing of waste fluid. In a further improvement, a novel stringing arrangement permits the number of wires to be reduced from 18 to 4, significantly mitigating the residual liquid problem.

With respect to the stacker, a second hinged conveyor structure substitutes for the prior leaf spring operation. This improves initial alignment of a sheet, since a sheet's accumulated momentum is no longer required for initial placement into the stacker. This no longer relies on air to give the sheet momentum and eliminates many degrees of freedom in the sheet, which in turn produces more accurate sheet placement. In addition, the improved stacker no longer pushes a sheet down into registration pins with force to achieve leaf spring separation, but instead lowers the sheet down in a more controlled fashion.

Deploying the foregoing improvements has led to more than an order of magnitude improvement in reliability of the overall system, from up to a 10% error rate, to a 0.5% or less error rate.

DETAILED DESCRIPTION OF PREFERRED EMBODIMENTS

I. Material Feeder

Figure 1:
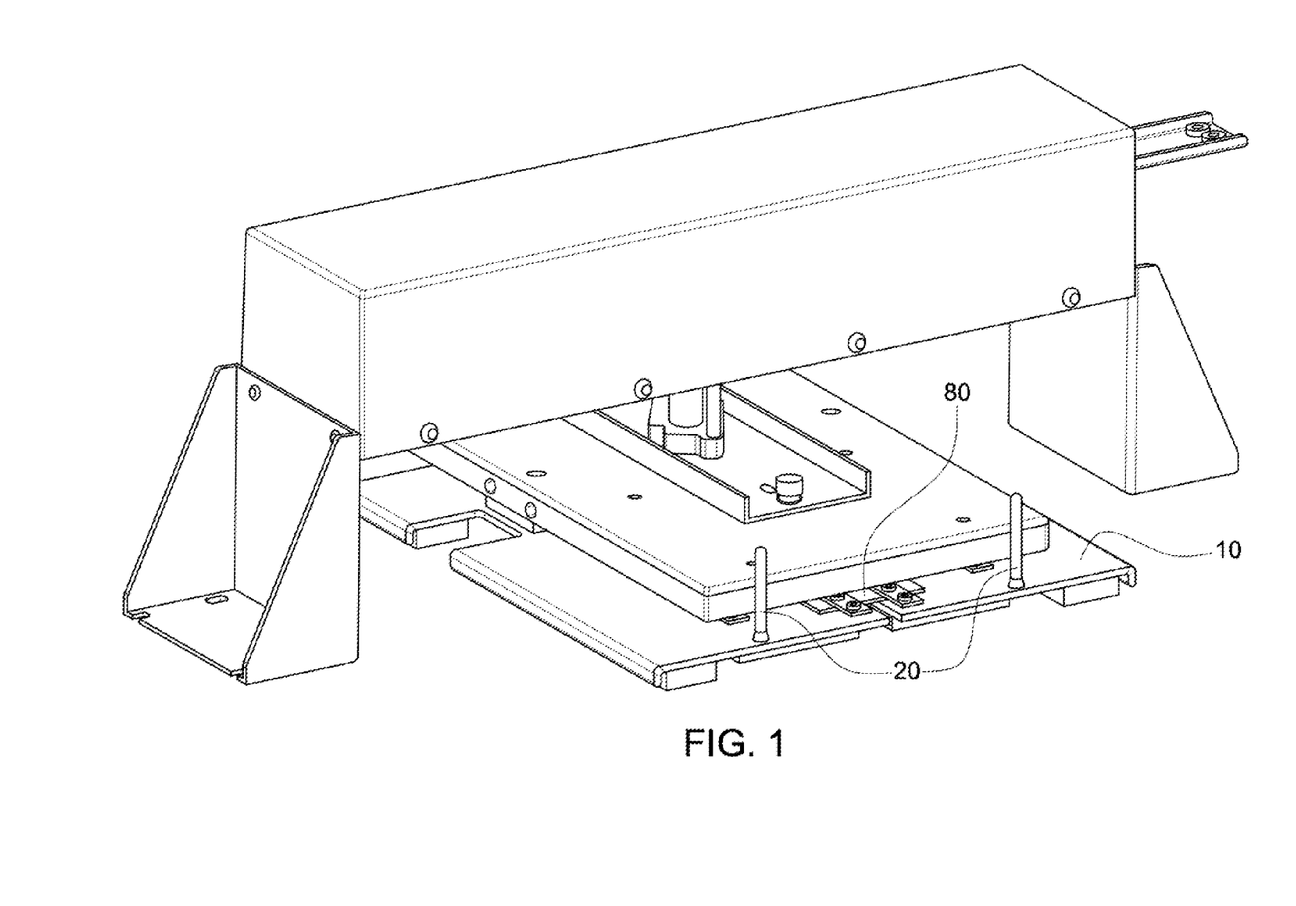
FIG. 1 shows a front perspective view of a felt gripper head system.

FIG. 1 depicts a novel felt gripper head 10 in accordance with the principles of the present invention for use in an improved material feeder. Similar to previous felt gripper heads described in prior patent filings of the assignee hereunder, where there exists a plurality of spring loaded pins with magnets at their tips, the present felt gripper heads comprise a plurality of push off fingers 20 with steel tips 30. These fingers 20 and tips 30 are used for depositing a lifted sheet onto the platen at the downstream printing stage. They operate by touching cooperating magnets situated into screw heads in the reservoir of the platen to thereby hold down a sheet when the felt gripper gets lifted to disengage from the sheet, whereupon the felt disengages, then the fingers push off to detach from the screw heads, at which time they go back to a quiescent state.

Figure 2:
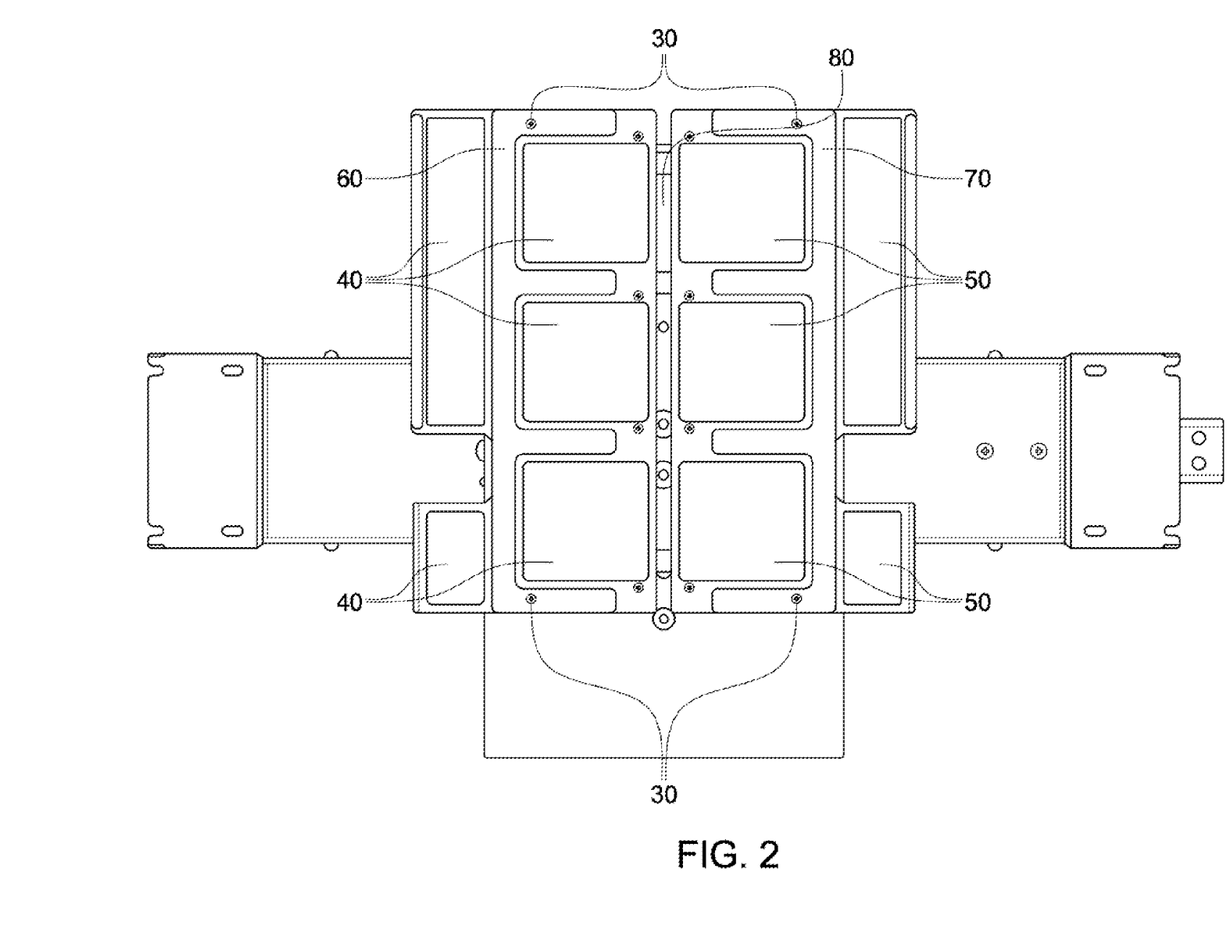
FIG. 2 shows a plan view of the felt side of the system of FIG. 1.

FIG. 2 depicts the geometry of the gripper head, and its separation of felt into regions. A first plurality of regions of felt 40 resides on one plate surface 60, and a second plurality of regions of felt 50 resides on another plate surface 70. These two surfaces 60 and 70 generally face the same direction, but have some freedom of movement with respect to each other, controlled by a bridged hinge separation 80. The distance between such separation is precisely controlled via software during the machine steps that result in lifting of a substrate sheet.

Figure 3:
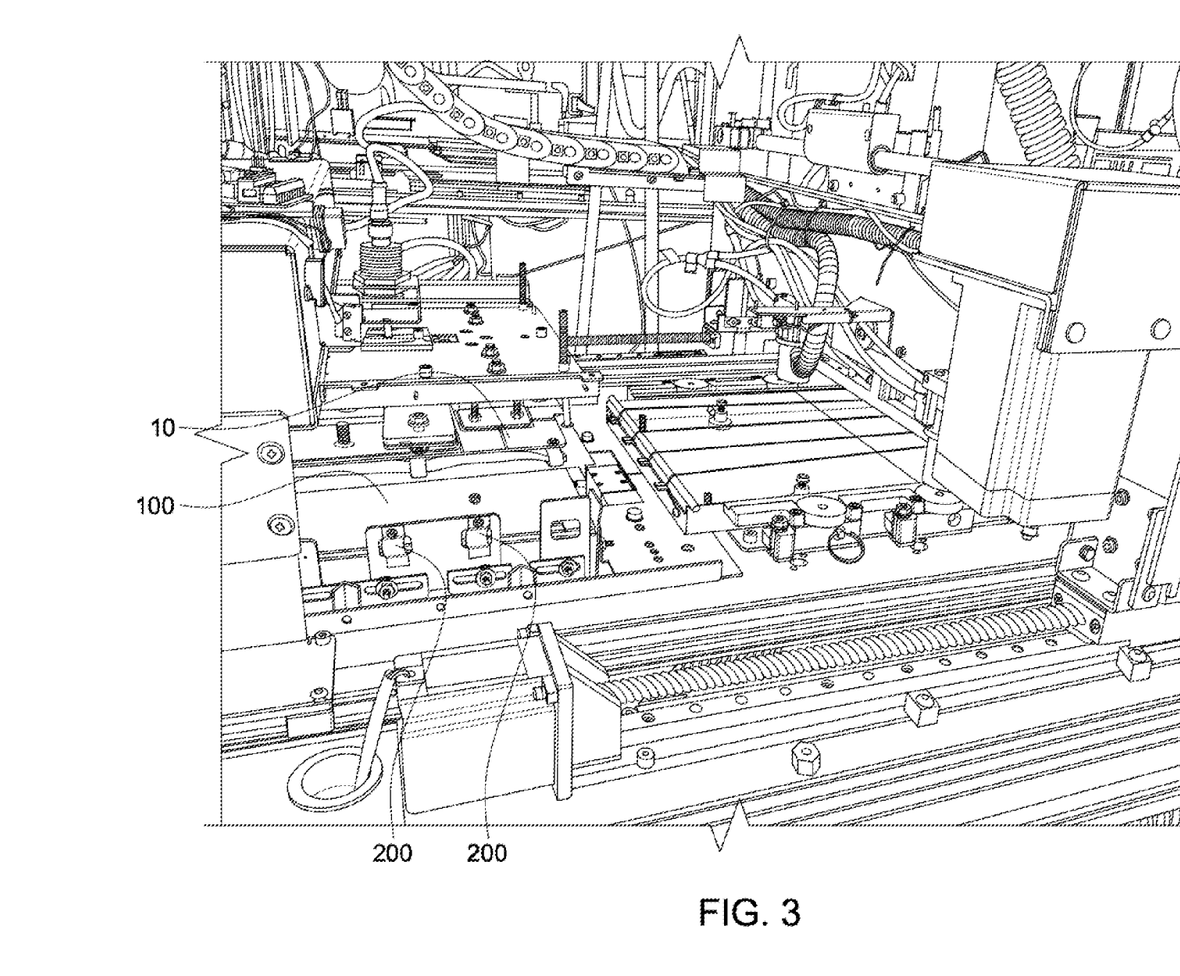
FIG. 3 shows the felt gripper system as it is situated in a larger 3D printing apparatus.

FIG. 3 shows the felt gripper head in its relation to the material feeder subsystem. The gripper head 10 rests initially above a stack of ordinary unadjusted (i.e., parallel-situated) substrate sheets 100. Note that flickers 200 are still present to assist in sheet separation. The general operation of the material feeder remains as before, with the gripper head under computer control dropping down and rising up to pick up a substrate sheet. Then the carriage containing the gripper head (with its gripped sheet) moves linearly toward the platen, lowering to place the sheet at a predetermined location on the platen. At this point, deposit of the sheet is as described before, using the fingers, magnets and screw heads. Deposition of a fresh sheet occurs just as a previously printed sheet gets conveyed via a conveyor away from the platen and into the powdering subsystem (thus achieving a pipelining effect).

Figure 4A:
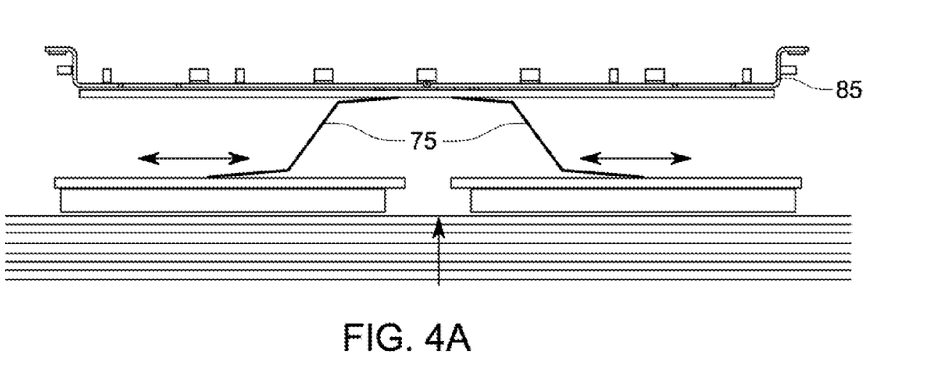
FIGS. 4A and 4B show fiber motion pick up mechanics of the felt gripper system as it first drops (FIG. 4A), then gets lifted (FIG. 4B).
Figure 4B:
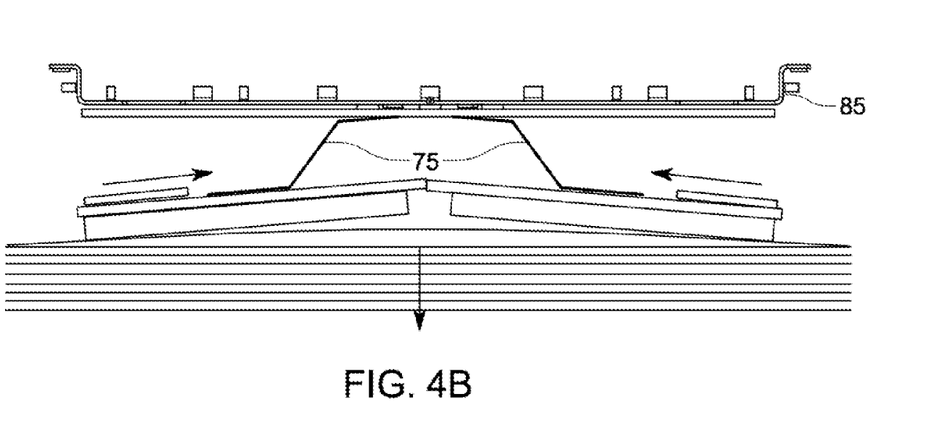

FIGS. 4A and 4B show how the sliding/gripping action occurs. When the gripper head 10 first drops (FIG. 4A), the plate surfaces 60 and 70 slide away from each other on top of the stack, causing felt regions 40 and 50 to make frictional contact and movement along the surface of the substrate sheet. Then as the gripper head 10 gets lifted (FIG. 4B), the plate surfaces 60 and 70 form a slight angle as the head continues to lift. This creates the distortion that makes a sheet separation between the top sheet and those below. As shown in FIGS. 4A and 4B, the bridged hinged separation 80 and its angular freedom of movement comes about because of the particular connection of angled-S-shaped bracket arms 75 (with off-center hinged connection) that each connect the plate surfaces 60 and 70 with the top plate 85 of the gripper head 10.

Thus the two pluralities of bridged felt regions 60, 70 during operation have a hinged connection 80 and are able to form a 2-5 degree angle with respect to one another. A planar distortion is created when the two plates move together, and go from a flat planar position to a slightly angled 2-5 degree non-planar position. This facilitates separation of a top sheet from the sheet below.

II. Platen

Figure 5:
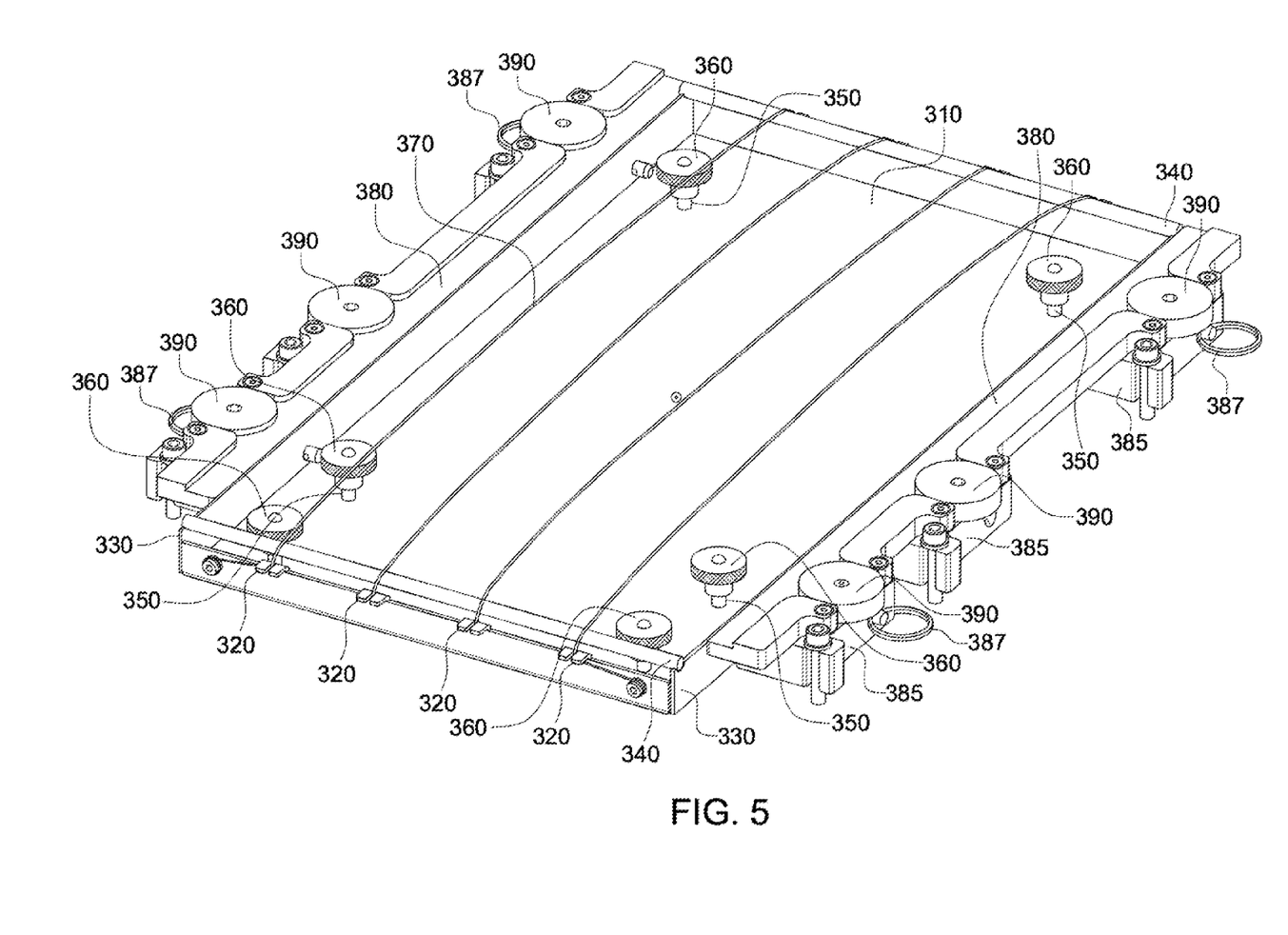
FIG. 5 shows a perspective view of a novel platen as situated between rails secured via aluminum blocks.

FIG. 5 depicts a novel platen 300 in accordance with the principles of the present invention. The platen 300 includes a rectangular tray 310. The depth of the tray is sufficient to receive waste liquid and absorbent pads as a reservoir, and is in fact deeper than the previous platen design (23 mm vs. 3 mm). On each short edge of the tray, there are four winding tab pairs 320 extending over such edges a short distance, each tab pair defining a slot in the middle. Alternatively, winding tab pairs can be replaced in alternative embodiments by any fixture design that fixes an end of a wire, such as screws, threading holes, slide locks, etc. Just inward of the short edges on the long edge are complementary rod rests 330. These rod rests form a location to receive a rod 340 that sits on top of these rests 330. This rod 340 so placed is adjacent to and parallel the short edge, just inward of that edge. Everything so far described along one short edge of the tray exists on the opposite short edge of the tray, symmetrically. The tray includes, in its reservoir, PEM studs 350 for receipt of ferromagnetic screw heads 360, described previously as cooperating with the material feeder steel tips 30 in the depositing of a substrate sheet.

After screwing on the screw heads (six in the depicted embodiment), assembly of the platen proceeds by placing the rods 340 on both sides onto their respective rod rests. Then the assembler wraps thin gauge piano wire 370 (e.g., 0.01" diameter SS304 polished) around a first winding tab pair 320 and feeds it over the near rod 340 toward the far rod 340, where the assembler then tightens and winds around the opposite winding tab pair in a manner that makes a single wire line taut across and parallel to the length of the tray. At that opposite winding tab pair, the assembler then moves sideways to the nearest tab pair on the same short side, then winds, then draws the wire line back to the near side over the rods again. The assembler then continues this winding, feeding and tightening operation until there are 4 taut wires across the reservoir.

Figure 6:
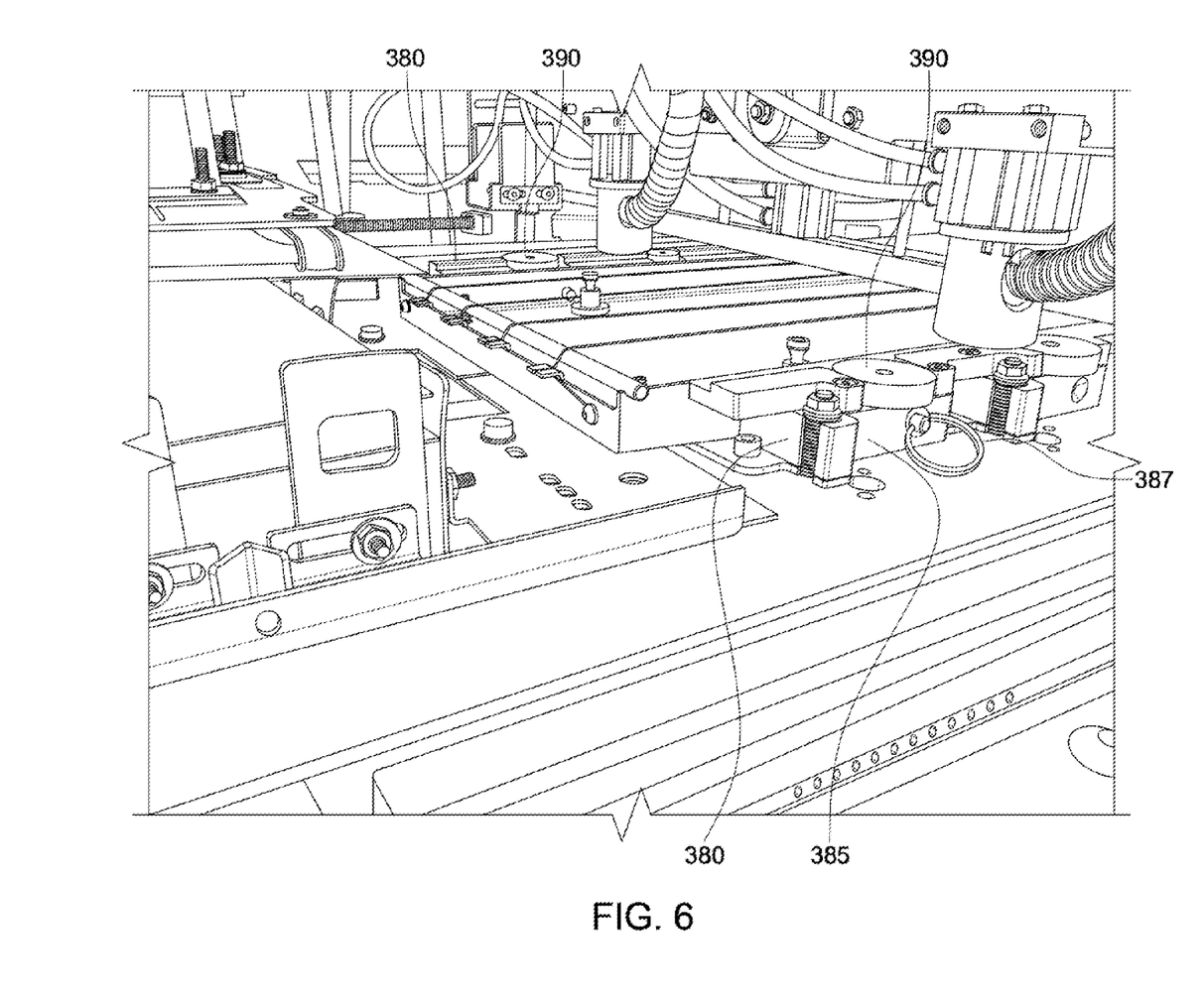
FIG. 6 shows the platen of FIG. 5 as it is situated in a larger 3D printing apparatus.

With the platen fully assembled, it is now ready for removable assembly onto the table top, as shown in FIGS. 5 and 6. For this, guide rails 380 have been previously placed into the table top. This is done by fastening (screwing) in the rails onto aluminum blocks 385. There are six aluminum blocks and two rails total (where the blocks are identical but the rails are mirrors of each other). The platen is inserted between the guide rails 380 such that the guide rails 380 now sandwich the two long sides of the platen. Four linchpins 387 may now suspend the platen as sandwiched between the guide rails and aluminum block assemblies so that it will not move. The guide rails' securement to the table top may be by fasteners nested in open slots of the aluminum blocks.

Different from prior platen designs, the platen 300 of the present embodiment does not contain hole punch backs. Instead, hole punch backs 390 exist in predetermined locations on the aforementioned aluminum blocks 385. In this way, the punching action onto the hole punch backs 390 occurs on a rigid structure (namely, aluminum blocks) borrowing rigidity from the table top, not a structure that can distort because of the punch itself.

In operation, with the simplified platen as described above, removal and cleanup of waste liquid is made easier because the platen is substantially lighter and less bulky than before, and is removable (suspended in place by means of removable linchpins 387). The wire winding arrangement discussed above also results in a minimum number of wires serving as the substrate sheet holding location (4 in the present embodiment). This mitigates the residual liquid problem described before. Other advantageous aspects of Applicant's platen described in prior filings have been preserved, including hold down pins for securement of a substrate sheet during printing, as well as the use of a time-sequenced pattern in the movement of such pins to maximize the effectiveness of the hold down. See U.S. Published Application No. 20200384783A1, incorporated by reference herein in its entirety.

III. Stacker

Figure 7:
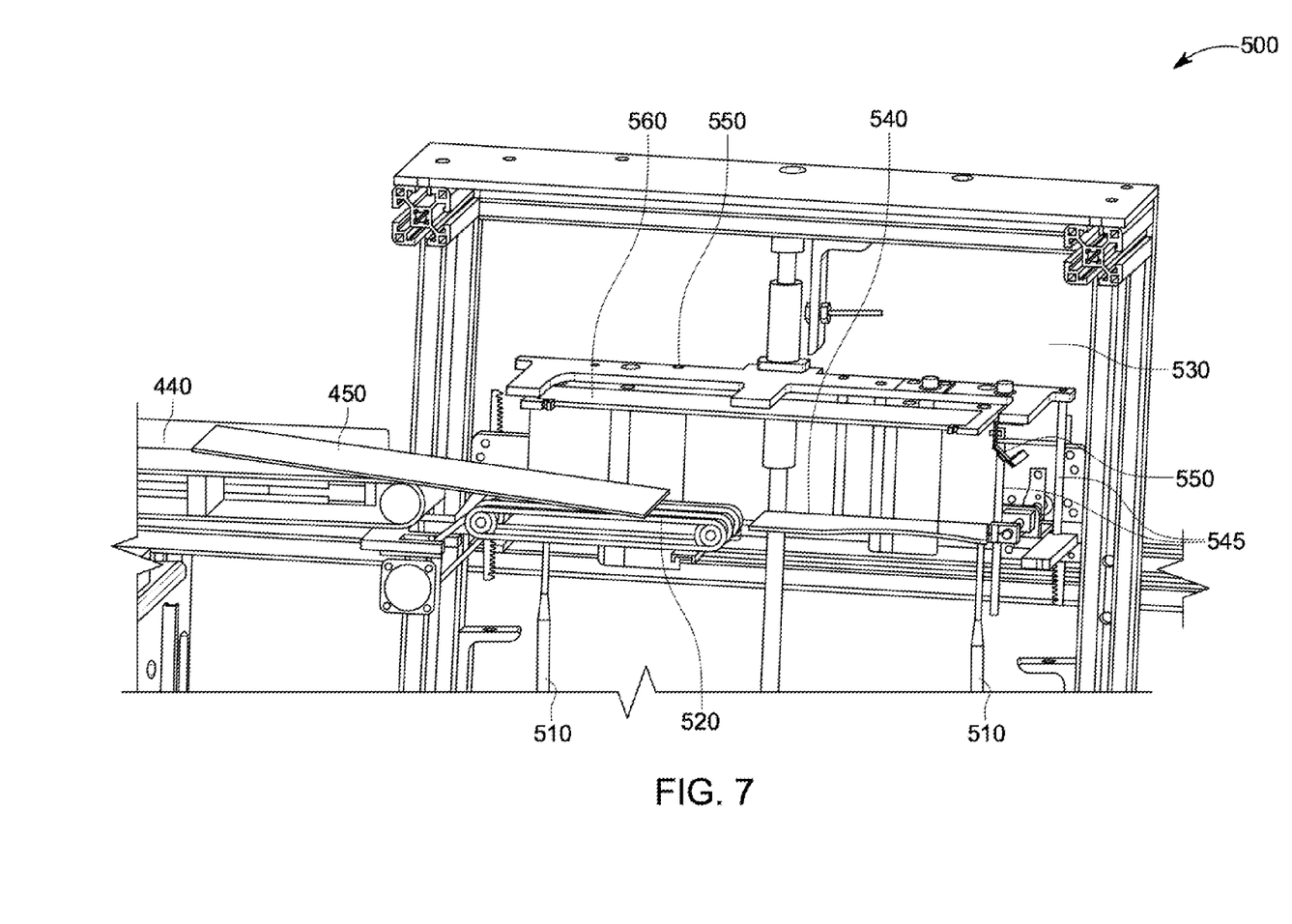
FIG. 7 shows a side view of a stacker apparatus according to the present invention.

FIG. 7 depicts a novel stacker 500 in accordance with the principles of the present invention. The stacker's operation is similar in many respects to the prior stacker of the '249 patent. An outfeed conveyor 440 delivers a processed sheet 450 (containing liquid-adhered powder) toward the stacker, where stacking onto tapered registration pins 510 occurs. Different from the prior stacker, a new positioning conveyor 520 is introduced inside the stacker's top cage 530. The positioning conveyor occupies about half the length of the stacker's top cage. It ensures control over the sheet's travel that did not exist in the previous design. At the rear of the stacker's top cage 530 is a supporting plate 540 and two sheet locating pins 545. A sheet detector sensor 550 also exists at the rear of the stacker's top cage. The dimensions of the positioning conveyor 520 and the supporting plate 540 are such that when a sheet 450 enters the top cage and then stops at the back (now being sensed as present), the positioning conveyor's 520 pushing force continues to engage the now-stopped sheet 450. That is, the sheet that has entered the top cage 530 is held via the conveyor force inside the cage in a fixed predetermined location that will not significantly change from sheet to sheet. No air flow is involved in the process to transfer the sheet into the stacker. The sheet always has contact with conveying system elements (outfeed conveyor, positioning conveyor, supporting plate and sheet locating pin).

Figure 8:
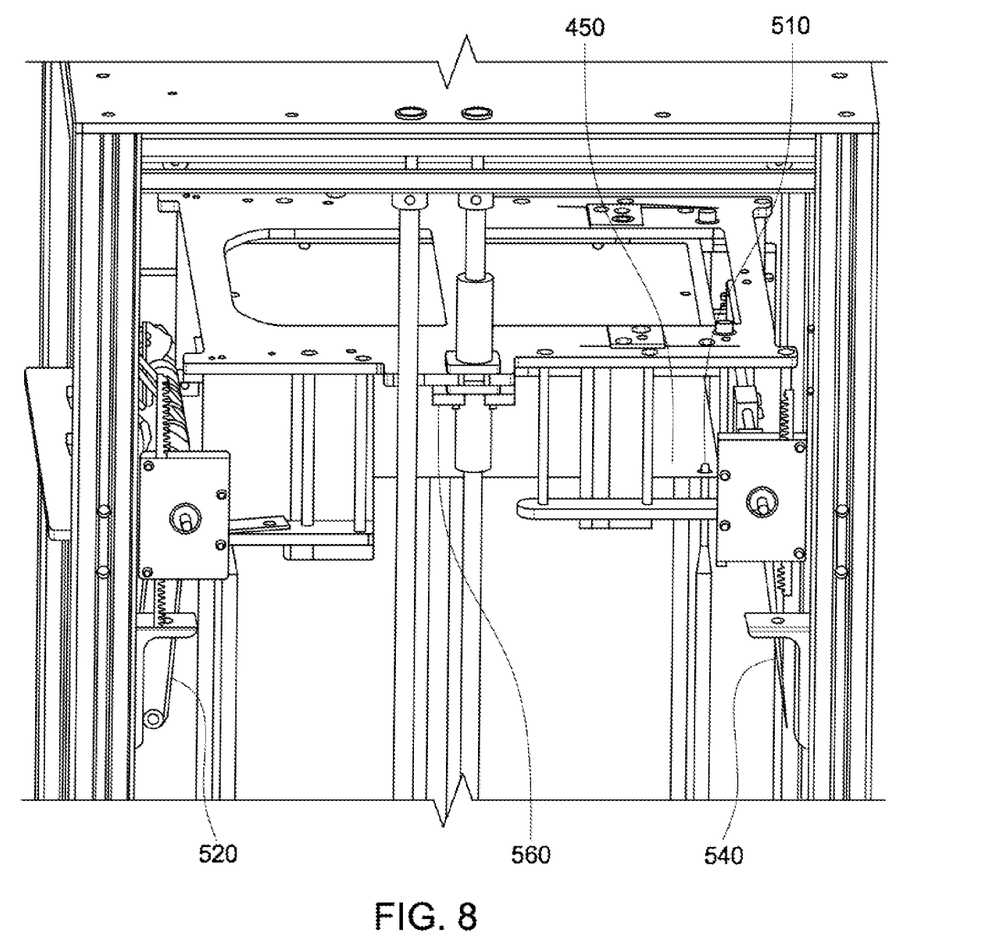
FIG. 8 shows an additional view of the stacker apparatus as it is ready to push down a printed and powdered substrate sheet into stacked registration.

The positioning conveyor 520 and supporting plate 540 are each hinged. Such hinging is configured to drop these parts away upon an electronic actuation signal. This creates a simultaneous hinged drop as shown in FIG. 8 that releases the sheet so that it can be pushed downward onto the registration pins 510. The electronic actuation signal is timed (e.g., via computer control) so that there is a slight pause between the sheet hitting the rear sensor, and the occurrence of the drop. Upon dropping of the sheet 450, a sheet catcher system that includes push plate 560 comes down from above, using a belt drive system, to push in a controlled fall the sheet 450 onto the registration pins 510. Since the hinged drop-away has occurred, there is no longer any need to push against leaf springs using the substrate sheet itself. This ensures further control, and consistent stacking geometries at the bottom of the stacker where the aligned build block comes into existence by means of buildup of adjacent sheets. The sheet catcher system 550 moves down to deposit the sheet, then moves back up into a home position, then the hinged positioning conveyor 520 and support plate 540 rotate back up into their home position, whereby the stacker 500 is now ready to receive another sheet 450. The stacker 500 thus controls the position of the sheet 450 during the entire cycle and releases the sheet only when registration pins are above the sheet (passing through registration holes). There is no uncontrolled flying, and the sheets always touch hard surfaces during the entire cycle. Alternatively to a hinged drop, a different configuration may be used as long as support for the sheet 450 gets removed. For example, a quick drop-and-slide action of positioning conveyor 520 and support plate 540 may be designed into the system, for instance using solenoids and motors. Or a sliding action akin to elevator doors may be used.

Figure 9:
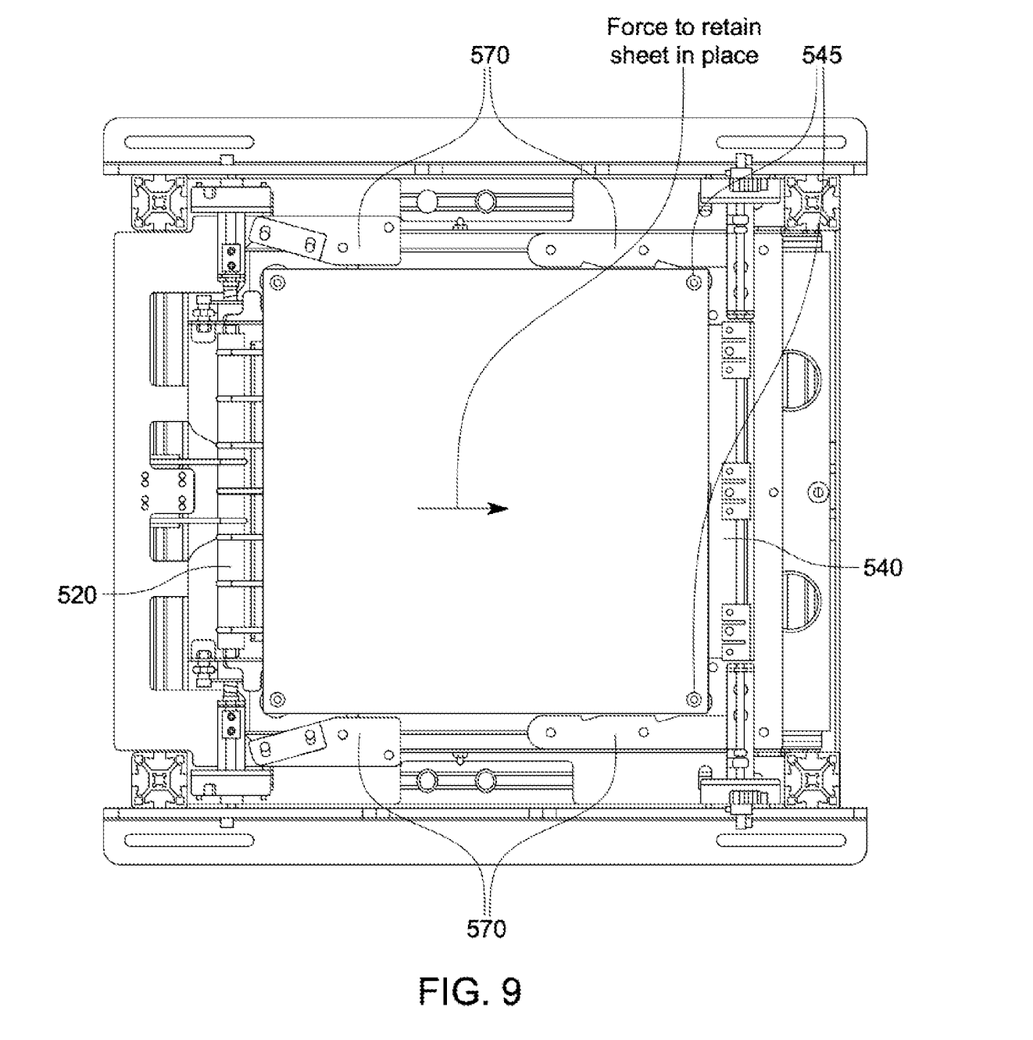
FIG. 9 shows a plan view of the inside of the upper cage of the stacker apparatus, depicting how sheets are forced to stay in place.

FIG. 9 is a depiction inside the top cage from above, showing also the presence of sheet aligning guides 570 configured to constrain the linear motion of the sheet into the cage by the positioning conveyor 520. Note that the support plate 540 is narrower than an incoming sheet 450 and is positioned between registration pins 510. This permits it to hinge downward without interfering with the registration of a dropping sheet.

While the above specification and examples provide a description of the invention, many embodiments of the invention can be made without departing from the spirit and scope of the invention. It is to be understood that the foregoing embodiments are provided as illustrative only, and do not limit or define the scope of the invention. Various other embodiments are also within the scope of the claims.

We claim:

1. A material feeder for feeding sheets of substrate material into a powder-based 3D-printing apparatus, comprising:
   (a) a carriage;
   (b) a felt gripper head suspended inside the carriage, the felt gripper head comprising:
      i. a first plate comprising a first region of felt, and
      ii. a second plate comprising a second region of felt,
   wherein the first plate and the second plate connect to one another through a bridged hinged separation.

2. The material feeder of claim 1, wherein the bridged hinge separation comprises a 2 to 5 degree angle between the first and second plates when the felt gripper head is not resting on a top sheet.

3. The material feeder of claim 2 wherein the 2 to 5 degree angle becomes zero degrees upon the felt gripper head coming to rest on a top sheet.

4. The material feeder of claim 1 wherein the felt gripper head further comprises:
   iii. a top plate that connects to the first plate and the second plate through angled S-shaped bracket arms, to create the bridged hinged separation based on off-center hinged connection of the first and second plates to the top plate,
   whereby dropping the felt gripper head onto a top sheet and then lifting the felt gripper head off the top sheet causes a sliding frictional contact that facilitates gripping, and a sheet distortion that facilitates separation from an immediately adjacent sheet.

5. The material feeder of claim 1 further comprising (c) a plurality of flickers positioned where edges of a gripped sheet would make contact upon lifting of the gripped sheet, whereby flicking action facilitates separation from an immediately adjacent sheet.

6. The material feeder of claim 1 wherein the first plate comprises a first plurality of regions of felt and the second plate comprises a second plurality of regions of felt.

7. The material feeder of claim 1 further comprising steel-tipped spring biased pins in the first and second plates, configured to cooperate with magnets after movement of the carriage to a subsequent printing stage and deposition of a gripped sheet onto a platen in a manner that places the steel tips into contact with magnets to facilitate pushing of a sheet off the gripper and onto the platen.

* * * * *